Dec. 8, 1959     F. E. BRADY, JR     2,916,042
FLOAT BALL CHECK VALVE
Filed Sept. 26, 1955
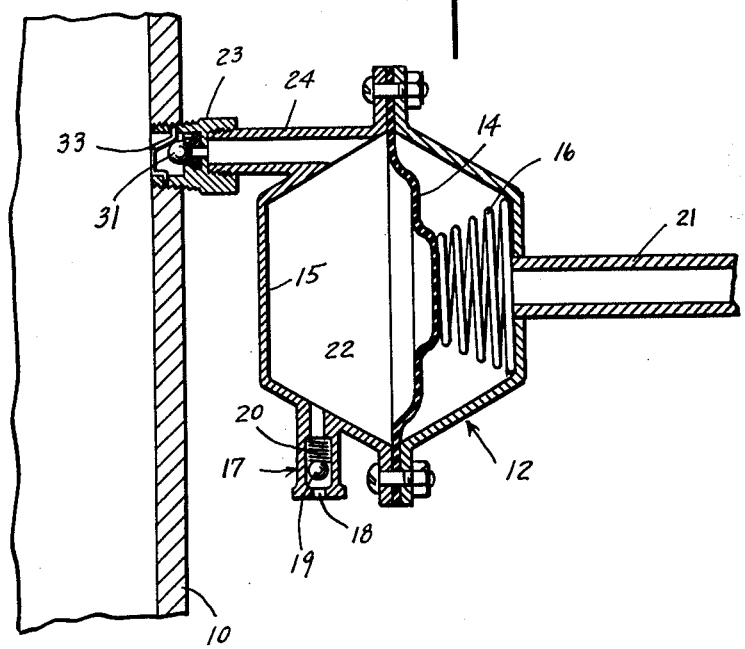
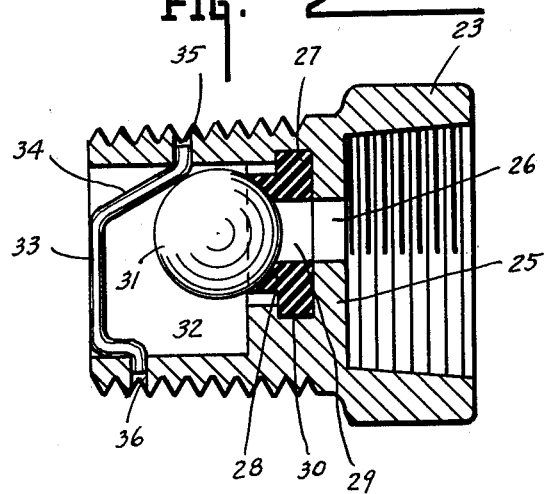
INVENTOR.
FRANCIS E. BRADY, JR.
BY Lockwood, Galt, Woodard & Smith
ATTORNEYS.

2,916,042
FLOAT BALL CHECK VALVE
Francis E. Brady, Jr., Muncie, Ind.

Application September 26, 1955, Serial No. 536,694

2 Claims. (Cl. 137—202)

This invention relates generally to check valves, and more particularly to a float ball check valve particularly adapted for use in fluid pressure systems of the type disclosed in my Patent No. 2,183,421, granted December 12, 1939.

In the system disclosed in the aforesaid patent there is an orifice connecting an air replenishing device to a pressure tank. When the water pump has started to resupply water to the tank, vacuum is impressed on the air replenishing device for accumulating a quantity of air for injection into the tank. This vacuum also causes a limited amount of water to flow through the orifice into said device. The more water which flows into the device during the pumping cycle, the less air can be injected into the tank. In large air replenishing devices, it is found that this back flow of water is not of material concern, but in smaller air replenishing devices it is found that this back flow of water reduces the amount of air injected into the tank to such an extent that insufficient air is injected to maintain a desired quantity of air within the tank under many conditions. Otherwise, a much larger air control must be used.

Accordingly, the principal object of this invention is to provide in an air replenishing device for domestic water systems means for preventing backflow of water into the air replenishing device during a pumping cycle.

Another object of the invention is to provide a float ball check valve adapted to respond to a very low degree of vacuum.

In accordance with this invention there is provided in combination with an air replenishing device for domestic water systems a sensitive check valve mounted in the air output end of the air replenishing device and responsive to water level within a pressure tank for opening or closing said output end, thereby to prevent any appreciable backflow of water into said air replenishing device during a pumping cycle.

Further in accordance with this invention there is provided a float ball check valve comprising a bushing having a port therein, a valve seat concentrically located with respect to said port, a float ball positioned within said bushing adjacent to said seat, and a ball guiding member mounted in said bushing and including a portion extending toward said valve seat for guiding the ball toward the seat when rising water moves the ball in an upward direction.

The full nature of the invention will be understood from the accompanying drawings and the following description and claims:

Fig. 1 is a cross sectional view of a float ball check valve embodying the invention and incorporated in an air replenishing device.

Fig. 2 is an enlarged longitudinal cross sectional view of the ball check valve illustrated in Fig. 1.

Referring to the drawings, this invention comprises a ball check valve adapted to be mounted in the side wall of a tank 10 which may be the pressure tank of a conventional domestic water supply system. The ball check valve may form a part of an air replenishing device comprising a 2-part casing member 12 having clamped therein a diaphragm 14 as disclosed in the previously mentioned patent. For biasing the diaphagm 14 normally to the left into contact with the wall 15 of casing 12, there is provided a spring 16. The casing 12 is also provided with an air inlet valve 17 having an orifice 18, a ball 19, and a ball control spring 20. As shown in Fig. 1, the air control system is in the position which it normally assumes when the pump (not shown) starts to replenish the water supply within the tank 10.

When the pump is started, the pipe 21, connected to casing 12 and to the pump, impresses vacuum on the chamber to the right of diaphragm 14, moving the diaphragm to the right and compressing the spring 16. This action causes the ball 19 in valve 17 to rise and admit air to the chamber 22 in casing 12. For a complete description of the structure and operation of the air replenishing device, reference may be had to the aforementioned patent.

During this portion of the pumping cycle it is necessary to prevent flow of water from tank 10 into chamber 22 for which purpose there is provided the float ball check valve as provided in accordance with this invention.

The float ball check valve includes a bushing 23 which may be screwed into the wall of tank 10 and to the outlet tube 24 of casing 12. The bushing 23 is formed to have a partition member 25 through which there is formed a port 26. Concentrically with port 26 there is mounted a valve seat 27 which may be formed of rubber or similar flexible material and may have a spherically curved seat portion 28 and a centrally disposed aperture 29. The valve seat 27 may be secured to the bushing 23 in any desired manner. For example, the valve seat may be pressed into an annular slot 30 within bushing 23.

A float ball 31 is located within the chamber 32 at the left hand end of bushing 23. The ball 31 may be formed of a plastic material or of rubber or similar material and may be hollow, whereby it will be very light in weight and sensitive to a slight degree of vacuum within the chamber 22 and the tube 24. For confining the ball 31 within chamber 32 there is provided a wire guide 33 having a ball guiding portion 34 extending toward the valve seat 27 for guiding the ball 31 toward the valve seat as water rises within the tank and within the chamber 32. The guide 33 may be fixed with respect to the bushing 23 by insertion within the holes 35, 36 in bushing 23 and into which the end portions of wire 33 may project.

In operation it may be assumed that the water level in tank 10 is below the level of the aperture 26 in bushing 23. In this event the float ball will not be in sealing relation with the valve seat 27 during the pumping cycle and air can flow freely into chamber 22 from tank 10 during the pumping cycle, thereby preventing injection of replenishing air when air replenishment is not required.

On the other hand, if the air in tank 10 has been depleted to such an extent that the water level therein is at or slightly above the level of the orifice 26 when the pump starts, pump vacuum on the right hand side of diaphragm 14 will cause movement of diaphragm 14 and the creation of vacuum within chamber 22. As soon as vacuum occurs within chamber 22, the ball 31 will move into seating relation with the valve seat 27. This is due to the slight current of water through the orifice 29 and the guiding action of guide wire 33. As soon as the ball 31 is moved into this position there will be no further flow of water into chamber 22, and this chamber will be substantially full of air at the end of a pumping cycle. Thus, the efficiency of the pressure control system is materially increased because it can inject a greater amount of air into tank 10 during each pumping cycle. At the termination of the pumping cycle, vacuum is removed from diaphragm 14 so that it can act to force the air in chamber 22 into tank 10 as described in the cited patent.

From the foregoing description of this invention, it will be apparent that there is provided a float ball check valve capable of responding to a very slight degree of vacuum or to a very slight change of water level. Thus, this check valve is particularly adapted for use with an air replenishing device for domestic water systems.

The invention claimed is:

1. A fitting for use in connection with an air replenishing device for water systems having separated vacuum and pressure chambers, comprising a horizontally disposed cylindrical bushing, a partition having an eccentric opening therein disposed transversely within said bushing inwardly from the ends thereof, said bushing having an internal recess in its wall on one side of said partition and concentric with said opening, an annular valve seat of compressible material abutting said partition having its outer edges seated in said recess and having a central opening aligned with the opening in said partition, a caging member comprising a straight wire extending vertically across and within said bushing near the end thereof and spaced from said valve seat with its ends secured in the wall of said bushing, a float ball disposed between said caging wire and said valve seat of less diameter than the distance between said wire and said seat and of less diameter than the internal diameter of said bushing so as to have free floating action laterally as well as longitudinally within said bushing, and the upper portion of said caging wire being inclined toward and above said valve seat whereby to guide said ball toward and into engagement with said valve seat when buoyed by liquid entering the bushing from the caging wire end thereof.

2. A fitting for use in connection with an air replenishing device for water systems having separated vacuum and pressure chambers, comprising a horizontally disposed cylindrical bushing, a partition having an eccentric opening therein disposed transversely within said bushing inwardly from the ends thereof, said bushing having an internal recess in its wall on one side of said partition and concentric with said opening, an annular valve seat of compressible material abutting said partition having its outer edges seated in said recess and having a central opening aligned with the opening in said partition, a caging member comprising a straight portion extending vertically across and within said bushing near the end thereof and spaced from said valve seat with its ends secured in the wall of said bushing, a float ball disposed between said caging member and said valve seat of less diameter than the distance between said member and said seat and of less diameter than the internal diameter of said bushing so as to have free floating action laterally as well as longitudinally within said bushing, and the upper portion of said caging member being inclined toward and above said valve seat whereby to guide said ball toward and into engagement with said valve seat when buoyed by liquid entering the bushing from the caging member end thereof.

References Cited in the file of this patent
UNITED STATES PATENTS

| | | |
|---|---|---|
| 622,720 | Sieben | Apr. 11, 1899 |
| 833,093 | Stevenson | Oct. 9, 1906 |
| 903,081 | Guthrie | Nov. 3, 1908 |
| 1,458,064 | Kushlan | June 5, 1923 |
| 2,183,421 | Brady | Dec. 12, 1939 |
| 2,220,209 | Carpenter | Nov. 5, 1940 |
| 2,447,173 | Gordon | Aug. 17, 1948 |
| 2,621,595 | Burks | Dec. 16, 1952 |
| 2,639,838 | Bierman | May 26, 1953 |